(12) United States Patent
Caloone

(10) Patent No.: US 11,480,168 B2
(45) Date of Patent: Oct. 25, 2022

(54) PISTON ROD SEALING SYSTEM FOR A RECIPROCATING MACHINE AND METHOD FOR SEALING SUCH PISTON ROD

(71) Applicant: ATLAS COPCO CREPELLE, S.A.S., Lille (FR)

(72) Inventor: Vincent Paul Caloone, Lille (FR)

(73) Assignee: ATLAS COPCO CREPELLE, S.A.S., Lille (FR)

(*) Notice: Subject to any disclaimer, the term of this patent is extended or adjusted under 35 U.S.C. 154(b) by 337 days.

(21) Appl. No.: 16/638,971

(22) PCT Filed: Oct. 3, 2018

(86) PCT No.: PCT/EP2018/076905
§ 371 (c)(1),
(2) Date: Feb. 13, 2020

(87) PCT Pub. No.: WO2019/072663
PCT Pub. Date: Apr. 18, 2019

(65) Prior Publication Data
US 2020/0200161 A1     Jun. 25, 2020

(30) Foreign Application Priority Data
Oct. 10, 2017   (FR) ...................................... 1759480

(51) Int. Cl.
*F16J 15/16*    (2006.01)
*F04B 53/16*    (2006.01)
*F04B 39/04*    (2006.01)

(52) U.S. Cl.
CPC ............ *F04B 39/041* (2013.01); *F04B 53/16* (2013.01); *F16J 15/16* (2013.01)

(58) Field of Classification Search
CPC ......... F04B 39/041; F04B 53/16; F16J 15/16; F16J 15/324; F16J 15/56
See application file for complete search history.

(56) References Cited

U.S. PATENT DOCUMENTS 3,542,374 A * 11/1970 Neilson ..................... F16J 15/56
                                                              277/927
4,222,575 A *  9/1980 Sekiguchi ............. F02G 1/0535
                                                              277/516
(Continued)

FOREIGN PATENT DOCUMENTS

CA       2987650 A1 *  6/2018 ............. F04B 39/041
JP    2012515298 A  *  5/2012 ............... F16J 15/18
(Continued)

OTHER PUBLICATIONS

International Search Report for PCT/EP2018/076905 dated Dec. 12, 2018 [PCT/ISA/210].

(Continued)

*Primary Examiner* — Gilbert Y Lee
(74) *Attorney, Agent, or Firm* — Sughrue Mion, PLLC

(57) ABSTRACT

A piston rod sealing system for a reciprocating machine (1), including a piston rod (8) having a first end (8a) connected to a piston (9), and a second end (8b) connected to a crankshaft (10), the piston rod (8) being received within a housing (7); and a sealing unit (11) provided between the piston rod (8) and the housing (7), and having a first lateral surface (12a) facing the first end (8a) and a second lateral surface (12b) facing the second end (8b). The sealing unit (11) includes a first rod seal (13) positioned in the vicinity of the first lateral surface (12a) and a second rod seal (14) positioned between the first rod seal (13) and the second lateral surface (12b), the sealing unit (11) being fixed within the housing (7). The second rod seal (14) includes a liquid injection pipe (15).

26 Claims, 3 Drawing Sheets

(56) References Cited

U.S. PATENT DOCUMENTS

| | | | |
|---|---|---|---|
| 4,833,976 A | 5/1989 | Loland | |
| 6,481,720 B1 * | 11/2002 | Yoshida | F16J 15/002 277/927 |
| 9,027,934 B2 * | 5/2015 | Lindner-Silwester | F16J 15/24 277/558 |
| 9,568,101 B2 * | 2/2017 | Hold | F16J 15/441 |
| 2011/0298183 A1 * | 12/2011 | Lindner-Silwester | F16J 15/406 277/500 |

FOREIGN PATENT DOCUMENTS

| | | |
|---|---|---|
| WO | 97/06343 A1 | 2/1997 |
| WO | 2012/150862 A2 | 11/2012 |

OTHER PUBLICATIONS

Written Opinion for PCT/EP2018/076905 dated Dec. 12, 2018 [PCT/ISA/237].

* cited by examiner

PISTON ROD SEALING SYSTEM FOR A RECIPROCATING MACHINE AND METHOD FOR SEALING SUCH PISTON ROD

CROSS REFERENCE TO RELATED APPLICATIONS

This application is a National Stage of International Application No. PCT/EP2018/076905 filed Oct. 3, 2018, claiming priority based on French Patent Application No. 1759480 filed Oct. 10, 2017.

BACKGROUND OF THE INVENTION

Field of the Invention

This invention relates to a piston rod sealing system for a reciprocating machine, the system comprising:
- a piston rod having a first end connected to a piston provided in a pressure chamber, and a second end connected to a crankshaft driving said piston rod, whereby the piston rod is received within a housing;
- a sealing unit provided between the piston rod and the housing, the sealing unit comprising a first lateral surface facing the first end and a second lateral surface facing the second end.

Background

The sealing of a pressure chamber has always been a focus within the industry. Whether such a sealing had an economical purpose because it meant not losing pressurized gas to the atmosphere, or a safety purpose because it meant not allowing dangerous gaseous components such as highly explosive gas, toxic gases or carcinogenic gaseous components to reach the atmosphere, it has always played an important role for the manufacturing companies.

Known sealing techniques create a gas sealing by using for example helium, nitrogen or other complex gas mixtures. Such systems having the disadvantage of being very expensive, because of the additional devices for storing and/or generating such gases on the premises of the user. Because such sealing systems are not one hundred percent efficient, and because the gases used for sealing mix with air, the users need to also take into account the costs associated with losses of the gas escaping the system and reaching the atmosphere. Such losses typically being between 0.5 percent and 3 percent from the capacity of the device, the costs of such losses being significant on a yearly basis.

Other sealing techniques are based on creating a mixture of oil and process gas for achieving the sealing, to capture the oil and the gas mixture, separate the oil from the gas, recover the gas and reuse the oil.

Such systems requiring a plurality of components for the separation and recovery process, making the overall system very complex. Such complexity having a negative impact on the manufacturing costs and on the maintenance process.

Yet another disadvantage of such systems is the contamination of the gas with oil particles, which imposes the usage of additional components such as filters and oil separators. Additionally such contamination limiting the usage of compressors implementing such sealing technology only for certain specific manufacturing processes.

Taking the above disadvantages into account, it is an object of the present invention to provide an easy to implement solution for sealing a piston rod of a reciprocating machine. Such a solution being durable and efficient, while maintaining the manufacturing costs low and insuring an easy maintenance process.

Another object of the present invention is to provide an energy efficient solution, to improve the efficiency of the overall system at the level of the process to which the system is connected and to provide an environmentally friendly solution.

At the same time, the sealing system of the present invention is aiming at providing a solution for which losses of the sealing agent are minimized, if not eliminated, and for which the user would not have to acquire additional devices for generating or storing such sealing agent.

Furthermore, the solution of the present invention is suitable to be implemented in all types of industries without limitation.

SUMMARY OF THE INVENTION

The present invention solves at least one of the above and/or other problems by providing a piston rod sealing system for a reciprocating machine, the system comprising:
- a piston rod having a first end connected to a piston provided in a pressure chamber, and a second end connected to a crankshaft driving said piston rod, whereby the piston rod is received within a housing;
- a sealing unit provided between the piston rod and the housing, the sealing unit comprising a first lateral surface facing the first end and a second lateral surface facing the second end;
- wherein
- the sealing unit comprises a first rod seal positioned in the vicinity of the first lateral surface and a second rod seal positioned between the first rod seal and the second lateral surface, said sealing unit being fixed within the housing; and
- the labyrinth seal comprises a liquid injection pipe.

Because the second rod seal comprises a liquid injection pipe, a liquid barrier is created between the process gas and the atmosphere. Moreover, because the sealing system comprises a first rod seal, the pressure variances from the pressure chamber are being smoothened and lowered towards the level of the second rod seal, increasing the efficiency of the sealing system.

Because the liquid barrier is being created, the leakage of gas towards the atmosphere is minimized or eliminated, making the reciprocating machine according to the present invention environmentally friendly, very efficient and even safe to use in systems using dangerous gases.

Because the sealing unit comprises a second rod seal and a liquid injection pipe, a sufficient pressure drop is assured between the pressure chamber and the atmosphere such that a very efficient and simple sealing is achieved.

At the same time, the rod seal does not allow air from outside the sealing unit to reach the pressure chamber, which makes the second rod seal act as a buffer between the two.

Furthermore, because the liquid reaching the second rod seal is pressurized, the sealing capability is increased, because the pressure of the gas reaching the second rod seal is counteracted by the pressure of the injected liquid, limiting even more the possibility of gas particles to pass through the second rod seal and reach the atmosphere.

Because the leakage of gas towards the atmosphere is minimized or eliminated, no loses are encountered, reducing the overall costs associated with the functioning of the machine.

Preferably, the pressure of the liquid injected in the second rod seal is maintained at a value slightly higher than the pressure of the gas reaching such second rod seal. By adopting such a technique, the gas will not be allowed to escape towards the atmosphere.

The pressure of the liquid injected through the liquid injection pipe being controlled by controlling the quantity of liquid reaching said liquid injection pipe.

By controlling the pressure of the liquid injected in the second rod seal in such a way, such liquid is in fact not allowed to enter the pressure chamber and gas particles are not allowed to reach the atmosphere.

In a preferred embodiment according to the present invention, but not limiting thereto, said second rod seal is in the shape of a labyrinth seal.

Said labyrinth seal, assuring a sufficient pressure drop between the pressure chamber and the atmosphere, minimizing even more the possibility of gas from said pressure chamber to reach the atmosphere or for atmospheric air to reach the pressure chamber.

In a preferred embodiment of the present invention the liquid injected through said liquid injection pipe is water. Consequently, the reciprocating machine according to the present embodiment can be used in all types of industries without limitations, such as for example and not limiting thereto: the food industry, the medical industry, industries requiring a very high purity of the gas, or industries using dangerous gaseous components for which a mixture of such gaseous components with other liquids or gases would potentially be very dangerous.

Because the reciprocating machine according to such embodiment uses water as injection liquid, the movement of the piston rod cannot affect the water film created between the piston and the sealing system, making such system very durable and easy to maintain.

Furthermore, by using water as injection liquid, the solution provided is very inexpensive, easy and safe to implement and maintain.

The present invention is further directed to a method for sealing a piston rod for a reciprocating machine, the method comprising the following steps:
  providing a piston rod having a first end connected to a piston and a second end;
  providing a sealing unit between the piston rod and a housing and fixing the sealing unit to the housing, the sealing unit comprising a first lateral surface facing the first end and a second lateral surface facing the second end;
wherein the method further comprises the steps of:
  providing a first rod seal in the vicinity of the first lateral surface and a second rod seal between the first rod seal and the second lateral surface; and
  injecting a liquid through a liquid injection pipe in fluid communication with the rod seal.

The present invention is further directed to a piston compressor comprising a gas inlet and a compressed gas outlet, whereby the piston compressor is provided with a piston rod sealing system according to the present invention.

The present invention is also directed to a piston vacuum pump comprising a vacuum inlet and a vacuum outlet, whereby the piston vacuum pump is provided with a piston rod sealing system according to the present invention.

In the context of the present invention it should be understood that the benefits presented with respect to the piston rod sealing system for a reciprocating machine also apply for the method for sealing a piston rod for a reciprocating machine, the piston compressor and the piston vacuum pump comprising such a sealing system.

BRIEF DESCRIPTION OF THE DRAWINGS

With the intention of better showing the characteristics of the invention, some preferred configurations according to the present invention are described hereinafter by way of example, without any limiting nature, with reference to the accompanying drawings, wherein.

DETAILED DESCRIPTION OF THE INVENTION

Figure 1:
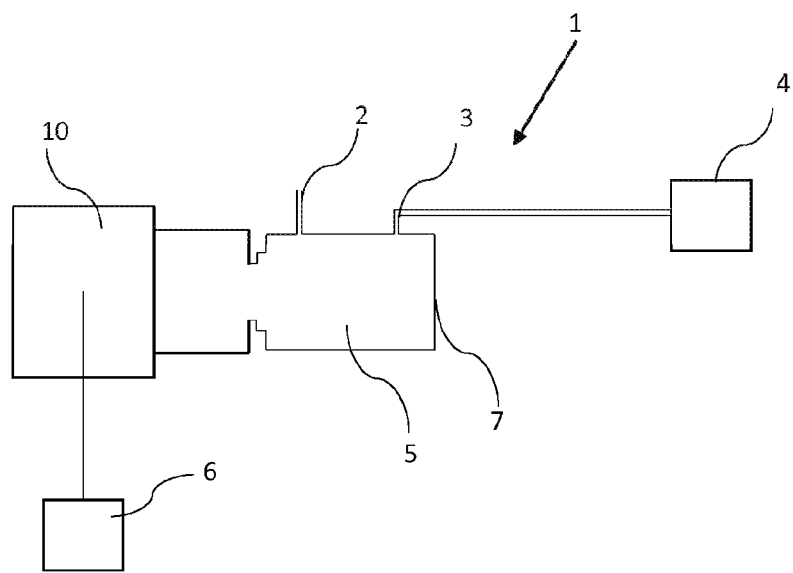
FIG. 1 schematically represents a reciprocating machine according to the present invention.

FIG. 1 illustrates a reciprocating machine 1 comprising a gas inlet 2 and a process gas outlet 3. The reciprocating machine 1 configure to provide process gas to a user's network 4.

Such reciprocating machine 1 comprising an element 5 being driven by a motor 6.

The reciprocating machine 1 might be a compressor or a vacuum pump. We will hereby explain, as an example, the situation in which the reciprocating machine 1 is a compressor.

In such an example, the element 5 is a compressor element.

Figure 2:
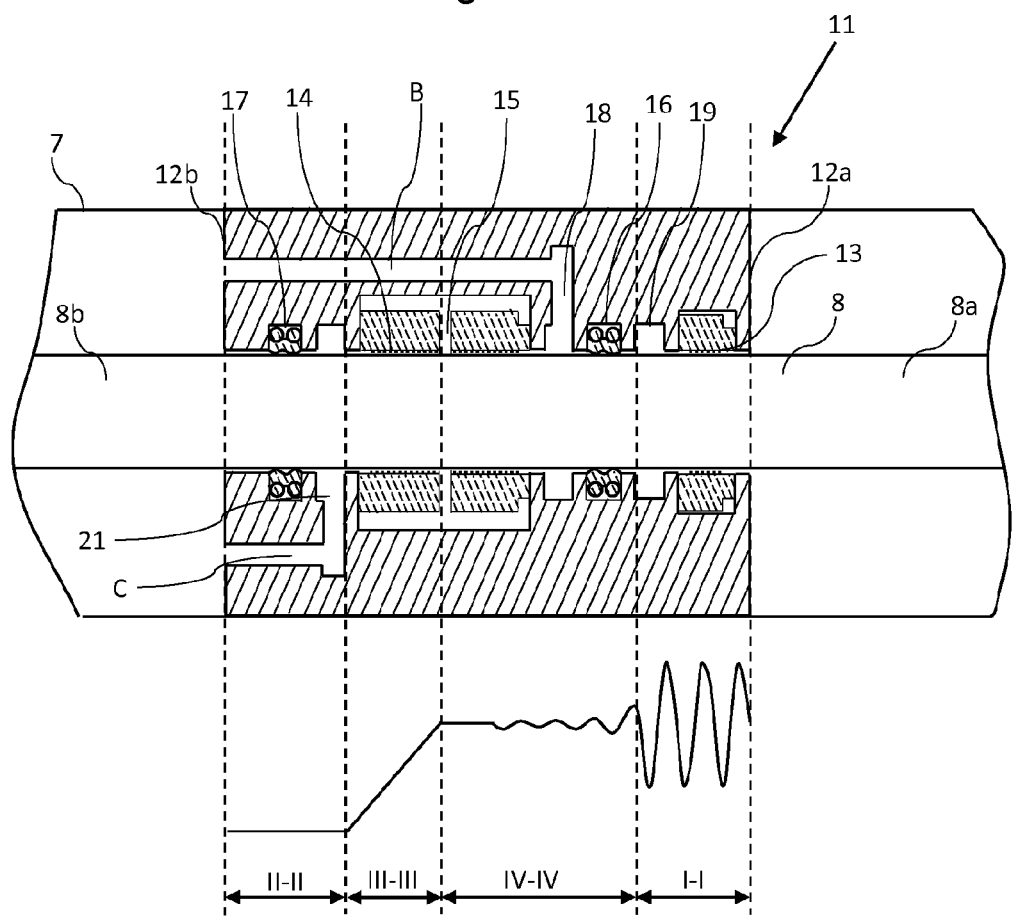
FIG. 2 schematically represents a cross section of a sealing unit according to an embodiment of the present invention.

Turning now to FIG. 2, the compressor element 5 comprises a housing 7, a piston rod 8 having a first end 8a connected to a piston 9 provided in a pressure chamber, and a second end 8b connected to a crankshaft 10 driving said piston rod 8.

The piston rod sealing system of FIG. 2 being provided between the pressure chamber and the crankshaft 10.

Furthermore, a sealing unit 11 is provided between the piston rod 8 and the housing 7, said sealing unit 11 comprising a first lateral surface 12a facing the first end 8a and a second lateral surface 12b facing the second end 8b.

As can be seen from FIG. 2, said sealing unit 11 is being provided around the piston rod 8.

For increased sealing properties and pressure control, the sealing unit 11 further comprises a first rod seal 13 positioned in the vicinity of the first lateral surface 12a and a second rod seal 14 positioned between the first rod seal 13 and the second lateral surface 12b. Preferably, the sealing unit 11 is fixed within the housing 7.

By the first rod seal 13 to be positioned in the vicinity of the first lateral surface 12a can be understood that such first rod seal 13 is positioned at a minimum distance from said first lateral surface 12a, said minimum distance being maintained for structural purposes, such that the robustness of the sealing unit 11 is maintained.

In other words, the first rod seal 13 is the seal closest to the first lateral surface 12a.

The above obviously implies that the first rod seal 13 is positioned between the second rod seal 14 and the first lateral surface 12a.

The first rod seal 13 and the second rod seal 14 are being mounted around the piston rod 8.

In an embodiment according to the present invention, the second rod seal 14 can be selected as any type of seal achieving a pressure drop between the pressure chamber and the atmosphere such that gas particles are not allowed to pass towards the atmosphere. As an example and not limiting thereto, said second rod seal 14 can be selected from a group comprising: a labyrinth seal, one or more O-ring seals, one or more lip seals, or others.

Said second rod seal 14 being manufactured from any type of material such as for example and not limiting thereto: Teflon, PTFE, any type of rubber, any type of plastic, any type of metal, or other material or a combination thereof.

Preferably but not limiting thereto, the second rod seal 14 is in the shape of a labyrinth seal.

Further preferably, the second rod seal 14 comprises a liquid injection pipe 15.

As can be seen in FIG. 2, and as tests have shown, the pressure variance within the pressure chamber is smoothened by the first rod seal 13, section I-I, and the liquid injection pipe 15 is acting as a buffer between the second lateral surface 12b and its characteristic pressure value, section II-II, and the first lateral surface 12a and its pressure variances, section I-I.

In a preferred embodiment according to the present invention and not limiting thereto, the first rod seal 13 can be a labyrinth seal.

The present invention should however not be limited to such a type of seal and it should be understood that other types of seals can be used for the first rod seal 13 as well, such as for example and not limiting thereto: an O-ring seal, a lip seal, a bushing, a graphite seal, a ceramic seal, or any other type of seal.

In a preferred embodiment but not limiting thereto, the liquid injection pipe 15 is positioned in the middle or approximately in the middle of the second rod seal 14.

As shown in FIG. 2, the liquid injection pipe 15 can have a circular shape, going around said piston rod 8 or it can have another layout such as for example it can comprise one or more injection points through which liquid is injected into the second rod seal 14. The injection points being spread around the circumference of the piston rod 8, and being or not at an equal distance from one another.

Because of this, the liquid injection pipe 15 is in fact acting as a damper between two separating sections: III-III wherein the pressure of the injected liquid is further influenced by the pressure value at the level of the second lateral surface 12b, which is typically the atmospheric pressure, and section IV-IV wherein the pressure of the injected liquid is influenced by the smoothened pressure from the pressure chamber. Consequently, the sealing efficiency is increased when compared to known sealing units.

By approximately in the middle should be understood that the liquid injection pipe 15 can be positioned at a relatively small distance from the location delimiting the middle of the second rod seal 14. Depending on the dimension of the sealing unit 11 such distance can be a couple of millimeters or even centimeters.

The position of the liquid injection pipe 15 should however not be limiting to being positioned in the middle of the second rod seal 14, and it should be understood that the liquid injection pipe 15 can be positioned at any location of the second rod seal 14, without departing from the scope of the present invention such as for example: at any location within the second rod seal 14 that is closer to the end facing the first rod seal 13 than the example illustrated in FIG. 2, or at any location within the second rod seal 14 that is closer to the end facing the second lateral surface 12b than the example illustrated in FIG. 2.

In an embodiment according to the present invention, for an even more increased sealing efficiency, the sealing unit 11 may comprise a first liquid wiper 16 positioned between the first rod seal 13 and the second rod seal 14. Said first liquid wiper 16 being mounted around the piston rod 8.

Consequently, the risk of encountering a mixture of the liquid injected into the liquid injection pipe 15 and of the gas present at the level of the first rod seal 13 is minimized.

For achieving an even more efficient liquid barrier and for achieving a pressure balancing within section II-II, the sealing unit 11 preferably comprises a second liquid wiper 17 positioned between the second rod seal 14 and the second lateral surface 12b. The second liquid wiper 17 being mounted around the piston rod 8.

In the context of the present invention, the first liquid wiper 16 and the second liquid wiper 17 should be each understood as an axial seal mounted around the piston rod allowing said piston rod 8 to have a reciprocating movement, separating liquid from gas and not allowing fluid or solid particles to pass. In other words the first liquid wiper 16 and the second liquid wiper 17 can be seen each as a component capable of retaining fluid or solid particles.

The first liquid wiper 16 and the second liquid wiper 17 being manufactured from any type of material such as for example and not limiting thereto: any type of rubber, PTFE, any type of plastic, an elastomer, any type of metal, a combination thereof or another material.

Further, it should be understood that other types of seals can be used for the first liquid wiper 16 and the second liquid wiper 17 and the present invention should not be limited to the use of a liquid wiper. Other types of seals can be selected from a group comprising: an O-ring seal, a labyrinth seal, a lip seal, a bushing, a graphite seal, a ceramic seal, or the like.

In another embodiment according to the present invention, the sealing unit 11 comprises a liquid channel in the shape of a groove 18 wherein liquid is injected, the groove 18 being positioned between the first rod seal 13 and the second rod seal 14.

Said groove 18 can realized as a circular groove around the piston rod 8.

By comprising such a groove 18, the sealing unit 11 comprises an additional barrier between the pressure chamber and the atmosphere, increasing even more the sealing efficiency in a simple and easy to implement manner.

In a preferred embodiment according to the present invention but not limiting thereto, the groove 18 is being positioned between the first liquid wiper 16 and the second rod seal 14.

In yet another embodiment according to the present invention, the sealing unit 11 further comprises a first chamber 19 positioned between the first rod seal 13 and the first liquid wiper 16.

In a preferred embodiment but not limiting thereto, the first chamber 19 can be realized as a circular chamber around the piston rod 8.

The present invention should however not be limited to a circular shape for the first chamber 19 and it should be understood that other shapes like for example: square, triangular or an irregular shape can be also used. Such a first chamber 19 creating a low pass filter effect.

Figure 3:
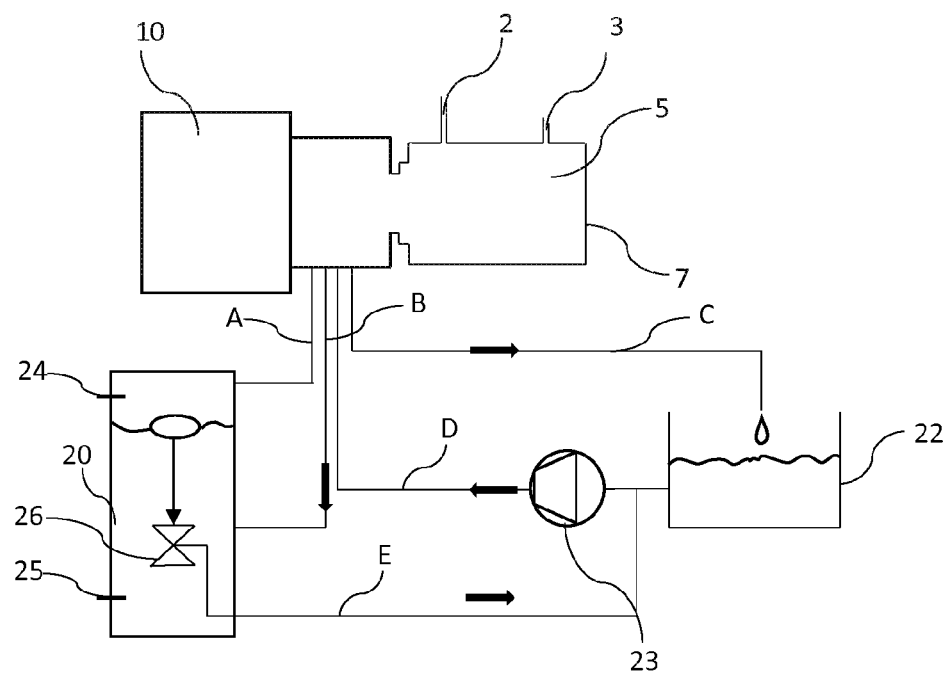
FIG. 3 schematically represents the circuit of the liquid injected in the labyrinth seal according to an embodiment of the present invention.

For a more efficient smoothening of the pressure of the gas in the pressure chamber, the sealing unit 11 comprises a pressure equalizing tank 20. As shown in FIG. 3, for equalizing the pressure of the fluid in the first chamber 19 with the pressure of fluid at the level of the groove 18.

For achieving this, the pressure equalizing tank 20 is connected to the first chamber 19 through a liquid conduit A and to the groove 18 through a liquid conduit B.

By controlling the pressure in the first chamber 19 and the groove 18, an efficient sealing of the first liquid wiper 16 is achieved, since the pressure gradient at the level of the first liquid wiper 16 is maintained low.

As shown in FIG. 3 the pressure equalizing tank 20 can comprise two sections, one wherein the fluid from the first chamber 19 is gathering and comprises conduit A, and another one wherein the fluid from the groove 18 is gathering and comprises conduit B. In the example illustrated in FIG. 3, the fluid from the first chamber 19 is gathering in the top part of the pressure equalizing tank 20 and the fluid from the groove 18 is gathering on the bottom part of the pressure equalizing tank 20.

Such a layout should however not be limiting, and it should be understood that another layout or even another shape of the pressure equalizing tank 20 would also work, as long as the two sections can be created.

By achieving such a pressure balancing, the liquid present in the groove 18 is brought at the same or approximately the same pressure value as the pressure value of the gas present in the first chamber 19, eliminating the risk of liquid to reach the pressure chamber.

In a preferred embodiment according to the present invention the fluid from the first chamber 19 is not mixing with the fluid from the groove 18.

For capturing the liquid injected in the injection pipe 15, the sealing unit 11 further comprises a second chamber positioned between the second rod seal 14 and the second lateral surface 12*b*.

The second chamber 21 preferably comprising a conduit C, allowing such liquid to reach a liquid vessel 22. Such liquid vessel 22 preferably being at atmospheric pressure.

The first chamber 19 and the second chamber 21 being realized around the piston rod 8.

In a preferred embodiment according to the present invention and not limiting thereto, the second chamber 21 is positioned between the second seal 14 and the second liquid wiper 17.

Consequently, in the unlikely event that liquid would pass the second chamber 21, it will be stopped by the second liquid wiper 17 and not be allowed to reach the atmosphere.

Such precautions make the sealing unit 11 according to the present embodiment very easy to manufacture and safe to use in applications using dangerous gaseous components.

The sealing unit 11 minimizes or eliminates losses of gas and of injected liquid, increasing its efficiency, decreasing the costs associated with the functioning of the reciprocating machine 1 and the maintenance process.

Preferably but not limiting thereto, the second chamber 21 can be realized as a circular chamber, around the piston rod 8.

In a preferred embodiment and not limiting thereto, the reciprocating machine is a water injected machine.

In another preferred embodiment according to the present invention and not limiting thereto, the liquid injected through said liquid injection pipe 15 is water.

Since water is typically not affecting the processes the reciprocating machine 1 is connected to, said reciprocating machine 1 can be used in any type of application and in any type of industry.

Furthermore, the costs associated with the functioning of the machine are even more reduced and the reciprocating machine according to the present embodiment is environmentally friendly.

It should be however not excluded that other liquids can be used as well such as for example and not limiting thereto: oil or any other type of sealing liquids.

It should be further not excluded that such liquids can be obtained by a combination of substances or that such liquids could further contain any types of additives.

In another embodiment according to the present invention, the sealing unit 11 further comprises a liquid vessel 22 which is connected to the liquid injection pipe 15 through a connection means, conduit D.

Said connection means, conduit D, being in the shape of, for example, a liquid pipe or an integrated channel.

Preferably but not limiting thereto, the liquid vessel 22 comprises liquid subjected to atmospheric pressure.

For efficiently performing the liquid injection, the sealing unit 11 can comprise a source of pressurized liquid feeding the liquid injection pipe 15 such as for example and not limiting thereto: a pump, a tank comprising pressurized fluid, an impeller or any other source.

Preferably, such source can be in the shape of a pump 23, said pump 23 for example being mounted on conduit D.

Said pump 23 helping in providing a pressurized liquid that is further injected through said liquid injection pipe 15.

Consequently, the pressure of the liquid injected through said liquid injection pipe 15 is influenced by the size of the pump 23 and its rotational speed.

Further, the pressure equalizing tank 20 can comprise a first communicating pipe (conduit A) towards the first chamber 19, a second communicating pipe (conduit B), towards the groove 18 and a third communicating pipe, (conduit E) towards the liquid vessel 22.

The arrows shown in FIG. 3 represent a preferred direction of flow of the liquid.

Preferably, each of the conduits A to D can comprise a liquid pipe or an integrated channel reaching the liquid injection pipe 15, the groove 18, the first chamber 19 and the second chamber 21. In the example shown in FIG. 2 and further illustrated in FIG. 4, at least a part of such conduits can be created through the body of the sealing unit 11, but other layouts should also be considered and the present invention should not be limited to the shown example.

Preferably, conduit E comprises a liquid pipe or a channel that can communicate with conduit D or with the liquid vessel 22.

For an easier communication with the liquid injection pipe 15, the groove 18, the first chamber 19 and the second chamber 21 and for an easier overall layout, the conduits A to D are created and communicate with the liquid injection pipe 15, the groove 18, the first chamber 19 and the second chamber 21 through the second lateral surface 12*b*, but they might as well be created and communicate through the first lateral surface 12*a* or through another surface of said sealing unit 11.

Because the circuit of the liquid injected into the second rod seal 14 is built in such a way, as shown in FIG. 3, any liquid droplets reaching the second chamber 21 are collected and returned back to the liquid vessel 22 without any additional components.

Furthermore, in the unlikely event that liquid droplets would reach the first chamber 19, such liquid droplets would also be captured through conduit A, brought into the pressure equalizing tank 20 from where they can be collected and recirculated, without any additional components.

Yet further, the gas reaching the first chamber 19 is also collected and returned to the pressure chamber, without any additional components. Accordingly, if the minimum value 25 is reached within the pressure equalizing tank 20, the valve 26 is actuated, allowing more fluid to reach said pressure equalizing tank 20 and forcing the gas entrapped therein to reach the pressure chamber though conduit A and the first chamber 19.

In a preferred embodiment according to the present invention and not limiting thereto, the piston rod 8 and the pressure chamber comprise a common housing 7.

By comprising a common housing 7 the sealing of the reciprocating machine 1 can be better assured and the manufacturing and mounting processes can be done easier.

Figure 4:
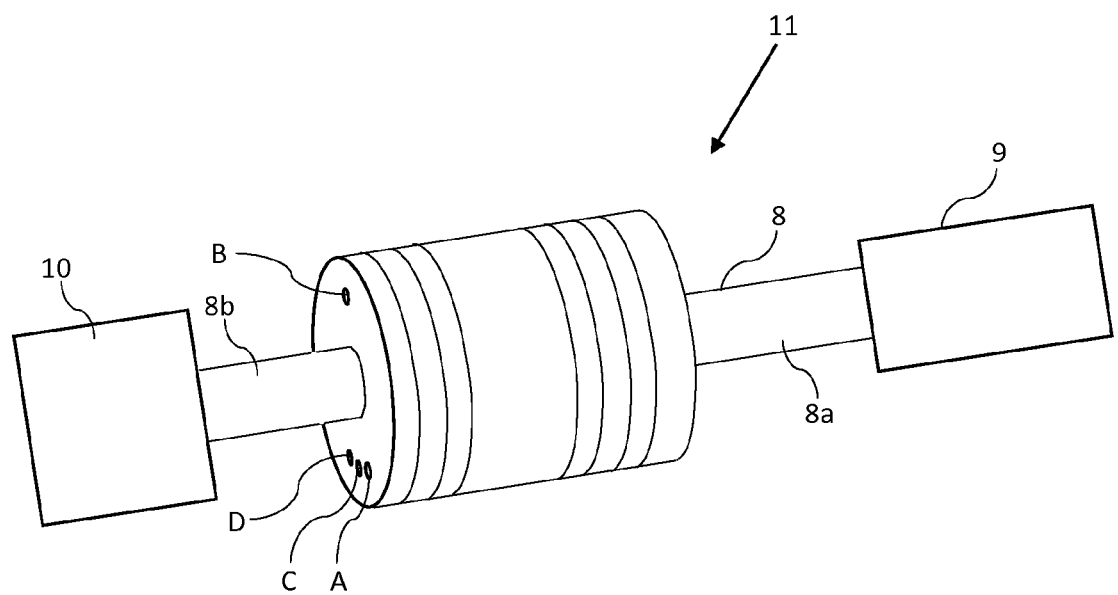
FIG. 4 schematically represents a perspective view of a sealing unit according to FIG. 2.
Figure 5:
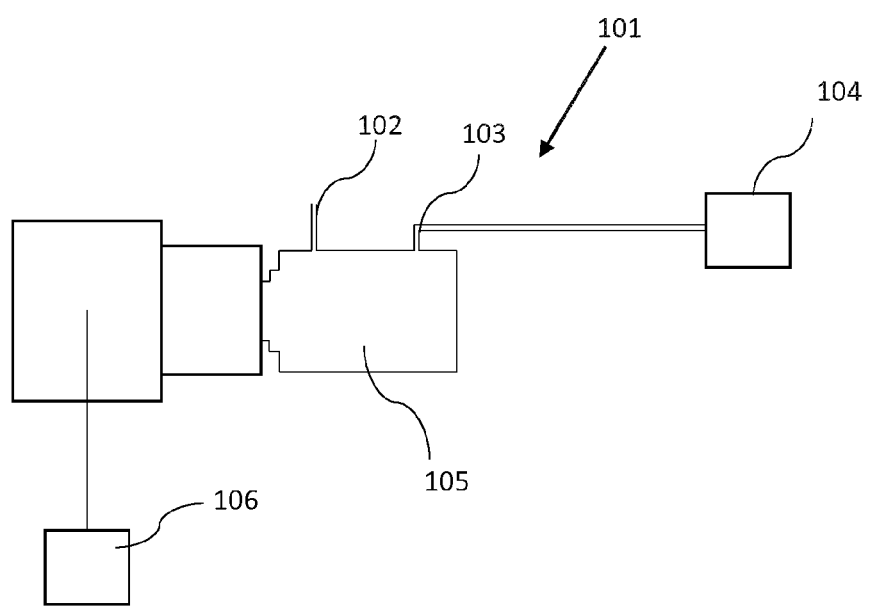
FIG. 5 schematically represents a vacuum pump according to the present invention.

FIG. 4 shows an example of layout for the conduits A-D according to the present invention.

It should be however understood that another layout is also possible and the present invention should not be limited to the presented example.

Depending on the application the reciprocating machine 1 is used in, the sealing unit 11 can comprise some or even all the technical features presented herein, in any combination without departing from the scope of the invention. By technical features it is meant at least: the first rod seal 13, the second rod seal 14, the liquid injection pipe 15, the first liquid wiper 16, the second liquid wiper 17, the groove 18, the first chamber 19, the second chamber 21, the pressure equalizing tank 20, the liquid vessel 22, the pump 23, the valve 26 and the layout of the conduits A-E.

The functioning principle of the sealing unit 11 according to the present invention is very simple and as follows.

The sealing unit 11 is provided between a piston rod 8 of a reciprocating machine and its housing 7, said sealing unit 11 being fixed within said housing 7.

During the functioning of the reciprocating machine 1, the pressure variance present in the pressure chamber is smoothened by the first rod seal 13.

It is also possible for the sealing unit 11 to comprise a plurality of such first rod seals 13, placed one after the other between the first lateral surface 12a and the first chamber 19. Such first rod seals 13 being of the same type or of a different type. For achieving an efficient sealing, a second rod seal in the shape of a labyrinth seal is provided, wherein a liquid is injected through the liquid injection pipe 15. Accordingly, a liquid barrier is created, stopping the gas from reaching the atmosphere.

In a preferred embodiment but not limiting thereto, the first rod seal 13 can be selected as a labyrinth seal.

In another embodiment according to the present invention, for a more efficient sealing, the injected liquid is pressurized.

For achieving an even more efficient sealing, the pressure after the first rod seal 13 can be equalized with the pressure after a first liquid wiper 16.

The pressure after the first rod seal 13 should be understood as the pressure of the fluid present at the level of the piston rod 8 or between the piston rod 8 and the sealing unit 11, at the location defined between the first rod seal 13 and the first liquid wiper 16.

The pressure after the first liquid wiper 16 should be understood as the pressure of the fluid reaching the piston rod 8 or being between the piston rod 8 and the sealing unit 11 at the location defined between the second rod seal 14 and the first liquid wiper 16.

For easily equalizing the pressure, the pressure equalizing tank 20 is provided.

In an embodiment according to the present invention, the step of equalizing the pressure comprises bringing the liquid injected into the second rod seal 14 and reaching a groove 18 positioned between the second seal 14 and the first rod seal 13 in fluid communication with the pressure equalizing tank 20, through conduit B.

In another embodiment according to the present invention, the step of equalizing the pressure further comprises bringing a fluid channel of a first chamber 19 in fluid communication with said pressure equalizing tank 20, through conduit A, said first chamber 19 being provided between the first rod seal 13 and the groove 18.

In a preferred embodiment according to the present invention, and not limiting thereto, the pressure of the liquid injected through the liquid injection pipe 15 is maintained at a value higher or slightly higher than the fluid in the first chamber 19.

Further, a second chamber 21 can be provided, said second chamber 21 being positioned between the second rod seal 14 and the second lateral surface 12b.

In a preferred embodiment according to the present invention and not limiting thereto, the liquid injected through said liquid injection pipe 15 is water.

Preferably, the liquid from the second chamber 21 is returned to a liquid vessel 22 and further to the liquid injection pipe 15. Consequently, the liquid injected in the liquid injection pipe 15 is recirculated and reused.

The method further comprises the step of maintaining the pressure of the liquid vessel 22 at atmospheric pressure.

For ensuring that the needed result is achieved at all times, the level of the liquid present within the pressure equalizing tank 20 is maintained below a maximum value 24 by opening or closing a valve 26 on a fluid pipe (conduit E) provided between the liquid vessel 22 and the pressure equalizing tank 20.

Further, the level of the liquid present within the pressure equalizing tank 20 can be maintained above a minimum value 25 by opening or closing said valve 26.

In a preferred embodiment and not limiting thereto, the level of the liquid present within the pressure equalizing tank 20 can be maintained between a maximum value 24 and a minimum value 25 by opening or closing said valve 26.

Such valve 26 can be any type of valve such as an automatically actuated valve or a manually actuated one.

If the valve 26 is automatically actuated, it can receive the open or close command directly from for example level sensors mounted within the pressure equalizing tank 20 or from a floater mounted within the pressure equalizing tank 20.

Other techniques for maintaining the level of the liquid between a maximum value 24 and a minimum value 25 value should also not be excluded from the present invention.

The level of the liquid present within the pressure equalizing tank 20 is preferably maintained between a maximum value 24 and a minimum value 25 such that fluid from the first chamber 19 will not reach the groove 18, or vice versa.

In a preferred embodiment according to the present invention and not limiting thereto, the reciprocating machine 1 is a piston compressor.

Although the invention as described above has been explained in the scenario of the reciprocating machine 1 being a compressor, it is equally possible that such machine is a vacuum pump 101.

In such a case, the element 5 is a vacuum element 105.

Accordingly, the reciprocating vacuum pump 101 has a vacuum element 105, having an inlet 102 connected to the user's network and an outlet 103 connected to the atmosphere or to an external network 104. The vacuum element 105 being driven by a motor 106.

It should be understood that, in the case of a vacuum pump 101, the sealing unit 11 has the same layout and the same functional properties as described above.

In a preferred embodiment according to the present invention, the reciprocating vacuum pump 101 is a piston vacuum pump.

In the context of the present invention it should be understood that the different features as defined herein can be used in any combination without departing from the scope of the invention.

The present invention is by no means limited to the embodiments described as an example and shown in the drawings, but such a sealing unit 11 can be realized in all kinds of variants, without departing from the scope of the invention.

The invention claimed is:

1. A piston rod sealing system for a reciprocating machine (1), the piston rod sealing system comprising:
    a piston rod (8) having a first end (8a) adapted to be connected to a piston (9) provided in a pressure chamber, and a second end (8b) adapted to be connected to a crankshaft (10) driving said piston rod (8), whereby the piston rod (8) is received within a housing (7);
    a sealing unit (11) provided between the piston rod (8) and the housing (7), the sealing unit (11) comprising a first lateral surface (12a) facing the first end (8a) and a second lateral surface (12b) facing the second end (8b);
    wherein:
    the sealing unit (11) further comprises a first rod seal (13) positioned in a vicinity of the first lateral surface (12a), and a second rod seal (14) positioned between the first rod seal (13) and the second lateral surface (12b), said sealing unit (11) fixed within the housing (7);
    the second rod seal (14) comprises a liquid injection pipe (15);
    the liquid injection pipe (15) is positioned in the middle of the second rod seal the sealing unit (11) further comprises:
        a first liquid wiper (16) positioned between the first rod seal (13) and the second rod seal (14),
        a liquid channel (18) in a shape of a groove wherein liquid is injected, the liquid channel (18) positioned between the first liquid wiper (16) and the second rod seal (14),
        a first chamber (19) positioned between the first rod seal (13) and the first liquid wiper (16); and
        a pressure equalizing tank (20) configured to equalize pressure of fluid in the first chamber (19) with pressure of fluid at the level of the liquid channel (18), and
    the pressure equalizing tank (20) is connected to the first chamber (19) via a first communicating pipe (conduit A), and is connected to the liquid channel (18) via a second communicating pipe (conduit B).

2. The piston rod sealing system according to claim 1, wherein the second rod seal (14) comprises a labyrinth seal or an O-ring seal.

3. The piston rod sealing system according to claim 1, wherein the sealing unit (11) further comprises a second liquid wiper (17) positioned between the second rod seal (14) and the second lateral surface (12b).

4. The piston rod sealing system according to claim 3, wherein the sealing unit (11) further comprises a second chamber (21) positioned between the second rod seal (14) and the second lateral surface (12b), and
    the second chamber (21) is positioned between the second rod seal (14) and the second liquid wiper (17).

5. The piston rod sealing system according to claim 1, wherein the liquid channel (18) is circular around the piston rod (8).

6. The piston rod sealing system according to claim 1, wherein the first chamber (19) is circular around the piston rod (8).

7. The piston rod sealing system according to claim 1, wherein the sealing unit (11) further comprises a second chamber (21) positioned between the second rod seal (14) and the second lateral surface (12b).

8. The piston rod sealing system according to claim 7, wherein the second chamber (21) is circular around the piston rod (8).

9. The piston rod sealing system according to claim 1, wherein the reciprocating machine (1) is a water injected machine.

10. The piston rod sealing system according to claim 1, wherein the liquid injected through said liquid injection pipe (15) is water.

11. The piston rod sealing system according to claim 1, wherein the sealing unit (11) further comprises a liquid vessel (22) which is connected to the liquid injection pipe (15) through a connection means (conduit D).

12. The piston rod sealing system according to claim 11, wherein said connection means (conduit D) comprises a liquid pipe or an integrated channel.

13. The piston rod sealing system according to claim 11, wherein the pressure equalizing tank (20) is further connected to the liquid vessel (22) via a third communicating pipe (conduit E).

14. The piston rod sealing system according to claim 1, wherein the piston rod (8) and the pressure chamber comprise a common housing (7).

15. A method of operating a piston rod sealing system for a reciprocating machine (1), the piston rod sealing system including a piston rod (8) having a first end (8a) and a second end (8b), the first end (8a) connected to a piston (9), and the piston rod sealing system further including a sealing unit (11) that is between the piston rod (8) and a housing (7), and fixed to the housing (7), the sealing unit (11) including a first lateral surface (12a) facing the first end (8a), a second lateral surface (12b) facing the second end (8b), a first rod seal (13) in a vicinity of the first lateral surface (12a), and a second rod seal (14) between the first rod seal (13) and the second lateral surface (12b), the method comprising the following steps:
    injecting a liquid through a liquid injection pipe (15) in fluid communication with the second rod seal (14);
    equalizing pressure after the first rod seal (13) with pressure after a first liquid wiper (16) of the sealing unit (11),
    wherein the liquid injection pipe (15) is positioned in the middle of the second rod seal (14) and injects the liquid within second rod seal (14),
    the sealing unit (11) further includes a groove (18) positioned between the first liquid wiper (16) and the second rod seal (14), and the step of equalizing comprises:
- providing the liquid, that is previously injected within the second rod seal (14) and reaches the groove (18), to a pressure equalizing tank (20) via a first conduit that is connected to the groove (18) and the pressure equalizing tank (20), and
- providing a fluid, that is within a first chamber (19) of the sealing unit (11), to the pressure equalizing tank (20) via a second conduit that is connected to the first chamber (19) and the pressure equalizing tank (20), the first chamber (19) provided between the first rod seal (13) and the first liquid wiper (16).

16. The method according to claim 15, wherein the injected liquid is pressurized.

17. The method according to claim 15, further comprising the step of maintaining the pressure of the liquid injected through the liquid injection pipe (15) at a higher value than the fluid in the first chamber (19).

18. The method according to claim 15, wherein the piston rod sealing system further includes a second chamber (21) positioned between the second rod seal (14) and the second lateral surface (12b).

19. The method according to claim 18, further comprising the step of returning the liquid from the second chamber (21) to a liquid vessel (22) and further to the liquid injection pipe (15).

20. The method according to claim 19, further comprising the step of maintaining the pressure of the liquid vessel (22) at atmospheric pressure.

21. The method according to claim 19, further comprising the step of maintaining a level of the liquid within the pressure equalizing tank (20) below a maximum value (24) by opening or closing a valve (26) on a fluid pipe (conduit E) provided between the liquid vessel (22) and the pressure equalizing tank (20).

22. The method according to claim 19, further comprising maintaining the level of the liquid within the pressure equalizing tank (20) above a minimum value (25) by opening or closing a valve (26) on a fluid pipe (conduit E) provided between the liquid vessel (22) and the pressure equalizing tank (20).

23. The method according to claim 19, further comprising maintaining the level of the liquid within the pressure equalizing tank (20) between a maximum value (24) and a minimum value (25) by opening or closing a valve (26) on a fluid pipe (conduit E) provided between the liquid vessel (22) and the pressure equalizing tank (20).

24. The method according to claim 15, wherein the liquid injected through said liquid injection pipe (15) is water.

25. A piston compressor comprising a gas inlet and a compressed gas outlet, wherein the piston compressor is provided with a piston rod sealing system according to claim 1.

26. A piston vacuum pump comprising a vacuum inlet and a vacuum outlet, wherein the piston vacuum pump is provided with a piston rod sealing system according to claim 1.

* * * * *